July 9, 1968 B. F. BRIESKE ET AL 3,392,077
APPARATUS AND METHOD FOR THE PRODUCTION OF GROMMET BAGS
Filed Jan. 25, 1965 4 Sheets-Sheet 1

INVENTORS
Bernard F. Brieske
George F. Brunkalla
by McDougall, Hersh & Scott
Attys

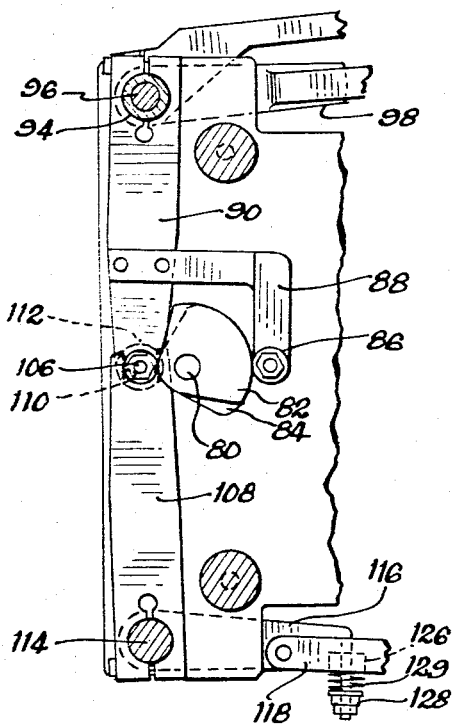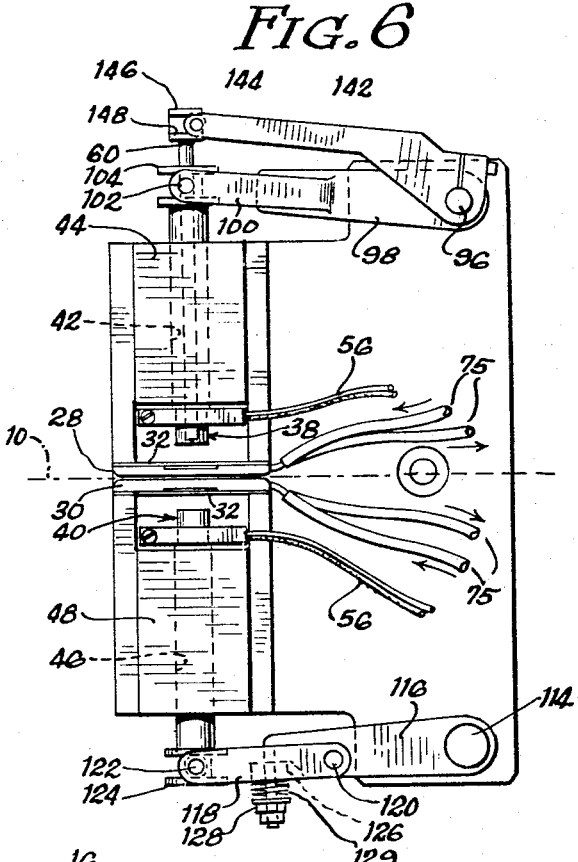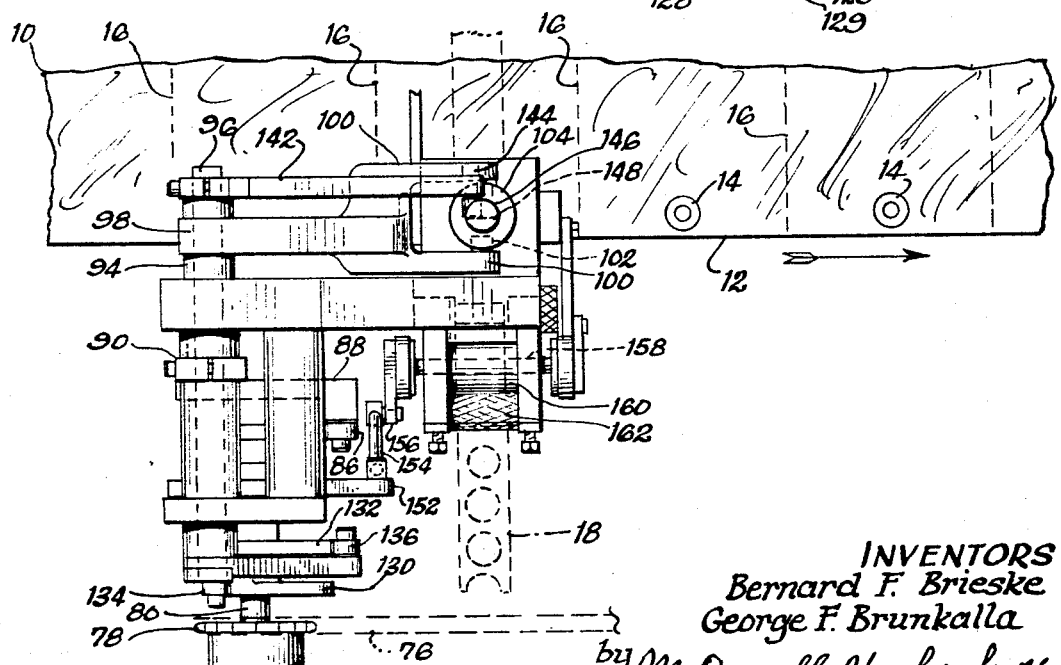

July 9, 1968    B. F. BRIESKE ET AL    3,392,077
APPARATUS AND METHOD FOR THE PRODUCTION OF GROMMET BAGS
Filed Jan. 25, 1965    4 Sheets-Sheet 3
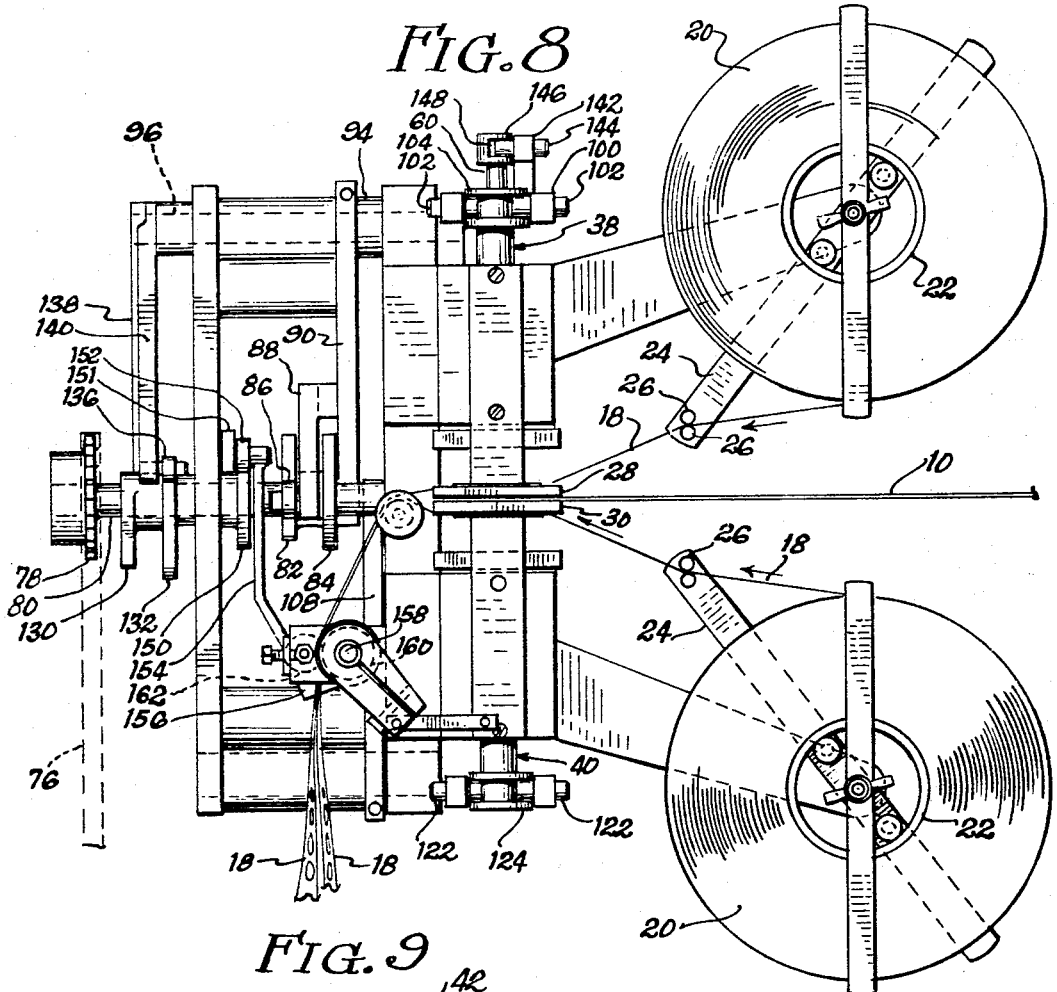
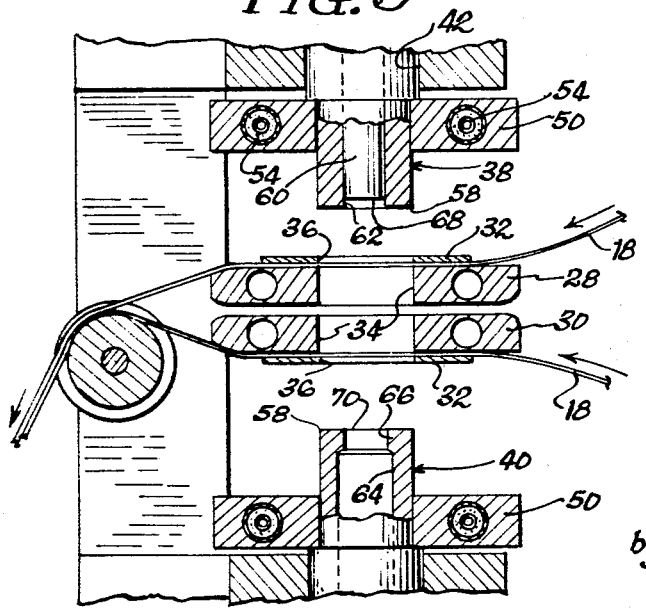
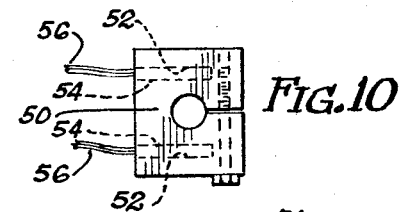
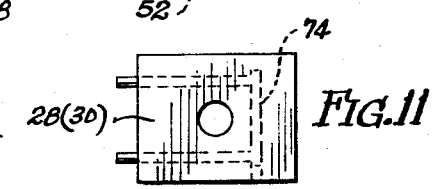
INVENTORS
Bernard F. Brieske
George F. Brunkalla
by McDougall, Hersh & Scott
Att'ys July 9, 1968   B. F. BRIESKE ET AL   3,392,077
APPARATUS AND METHOD FOR THE PRODUCTION OF GROMMET BAGS
Filed Jan. 25, 1965   4 Sheets-Sheet 4

INVENTORS
Bernard F. Brieske
George F. Brunkalla
by McDougall, Hersh & Scott
Att'ys 3,392,077
Patented July 9, 1968

3,392,077
APPARATUS AND METHOD FOR THE PRODUCTION OF GROMMET BAGS
Bernard F. Brieske, Palatine, and George F. Brunkalla, Medina, Ill., assignors to Vision Wrap Industries, Inc., Schiller Park, Ill., a corporation of Illinois
Filed Jan. 25, 1965, Ser. No. 427,773
19 Claims. (Cl. 156—253)

ABSTRACT OF THE DISCLOSURE

Method and apparatus for forming grommet bags wherein the grommets comprise a pair of annular members located on opposite sides of a plastic bag with aligned openings defined by each of the members and by the bag. The grommets are heat sealed to the bag by a pair of movable grommet applying heated tools. A continuous supply of the plastic is passed between the tools and a continuous supply of grommet forming material is simultaneously moved between the tools. The tools are driven toward each other into contact with the grommet forming material whereby heat will be transmitted to achieve the heat sealing. One of the tools carries a piercing member, and the other defines a bore for receiving the piercing member, the piercing member having a drive means which permits extension and retraction of the piercing member relative to the one tool. The movements of the tools and piercing members are synchronized so that the heat sealing and piercing operations take place substantially simultaneously.

---

This invention relates to bags adapted to hold a wide variety of materials under a wide variety of conditions. The invention is particularly concerned with bags or similar containers which are formed of polyethylene or equivalent materials and which are provided with grommets whereby the bags can be effectively employed for rack merchandising and for similar uses. Specifically, the invention is directed to methods and constructions for the production of such bags.

It is an established fact thta the cost of packaging must be taken into consideration in determining profit which can be made in the merchandising of bags. It is, therefore, highly important in the packaging industry to provide bags and other containers which are economical in their manufacture. It is also important to provide bags which are capable of retaining the items therein over indefinite periods without danger of breaking or tearing of the bags. Finally, it is an important consideration in the packaging industry to provide bags which do not detract from or which increase the sales appeal of articles contained therein.

In the packaging industry, use has been made of polyethylene bags due to the fact that these bags are possessed of many desirable characteristics. Specifically, polyethylene is a relatively inexpensive material, and in most instances, has the necessary physical characteristics whereby most articles can be safely stored therein. Furthermore, the transparent nature of the polyethylene enables purchasers to view the contents, and, therefore, such bags are desirable from a sales appeal standpoint.

In many instances, it is desirable to provide bags which are suitable for rack merchandising. Specifically, merchants are interested in displaying goods on racks in order to make maximum utilization of available space and in order to locate the goods where they can be easily reached by the public. Where polyethylne bags have been employed for such rack merchandising, difficulties have been encountered due to the fact that the polyethylene tends to tear once holes are punched therein or when any metal members are attached thereto. These tears are generally caused by gauge variations in the polyethylene or when non-concentric metal grommets of the type which are deformed during application are encountered.

It is an object of this invention to provide systems for producing a unique bag construction which overcomes the difficulties previously encountered in the manufacture and use of bags employed for rack merchandising.

It is a more particular object of this invention to provide a bag embodying a unique grommet arrangement whereby a highly economical bag having ideal characteristics for rack merchandising can be provided.

It is a further object of this invention to provide a highly efficient method for producing bags of the type described whereby extremely large numbers of the bags can be rapidly produced at a low unit cost.

It is a still further object of this invention to provide an apparatus for the production of bags of the type described and capable of carrying out the highly efficient method of this invention.

These and other objects of this invention will appear hereinafter and for purposes of illustration, but not of limitation, specific embodiments of this invention are shown in the accompanying drawings wherein:

FIGURE 5 is a fragmentary rear elevational view illustrating the cam elements and cam followers utilized for operating the grommet applying tools;

FIGURE 6 is a front elevational view of the structure;

FIGURE 7 is a top view of the structure;

FIGURE 8 is a side elevational view of the structure;

FIGURE 9 is a cross-sectional view taken about the line 9—9 of FIGURE 2;

FIGURE 10 is a detail view of the heating plate adapted to be associated with each tool;

FIGURE 11 is a detail view illustrating the cooling passages in the platen members;

Figure 12:
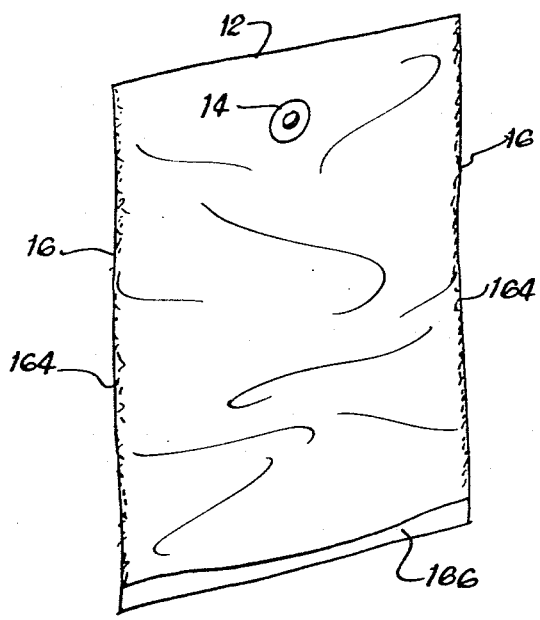
Figure 13:
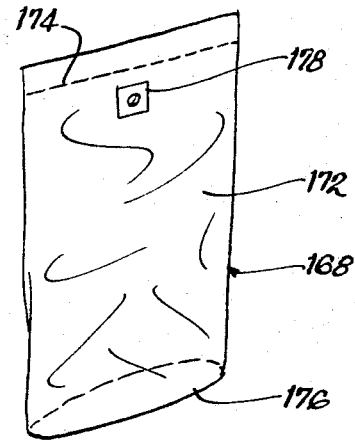
Figure 14:
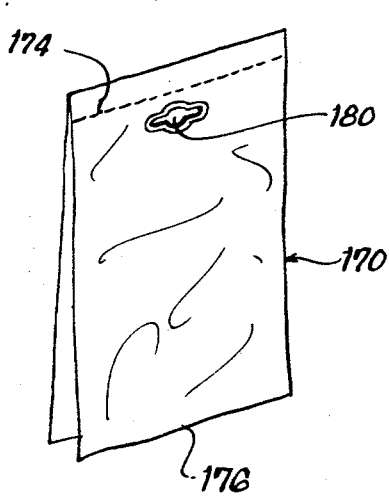
Figure 15:
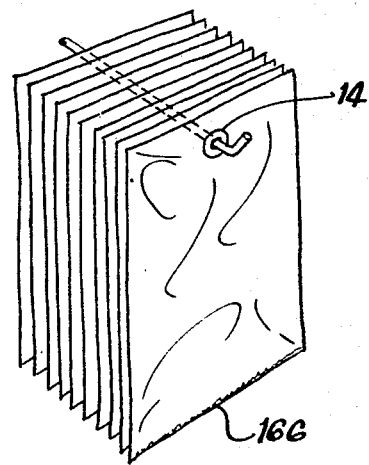

FIGURES 12, 13 and 14 comprise bag configurations adapted to be formed in accordance with the principles of this invention; and FIGURE 15 illustrates the use of the bag of this invention for rack merchandising.

The method of this invention generally involves the steps of providing a heat sealable material, such as polyethylene, for the formation of the enclosure defined by the bag. A pair of grommet forming members are positioned adjacent one edge of the material and on opposite sides thereof. Thereafter, heated tools are applied to provide for heat sealing of the members to the material, and these tools include means for piercing the grommet forming members whereby openings are formed substantially simultaneously with the application of the members to the material.

The particular apparatus of this invention is uniquely suitable for carrying out the method and for producing the novel bags. As will become apparent, the apparatus is adapted to apply the grommets in a continuous operation to thereby permit forming of bags in an extremely rapid and efficient operation while maintaining high quality standards.

Figure 1:
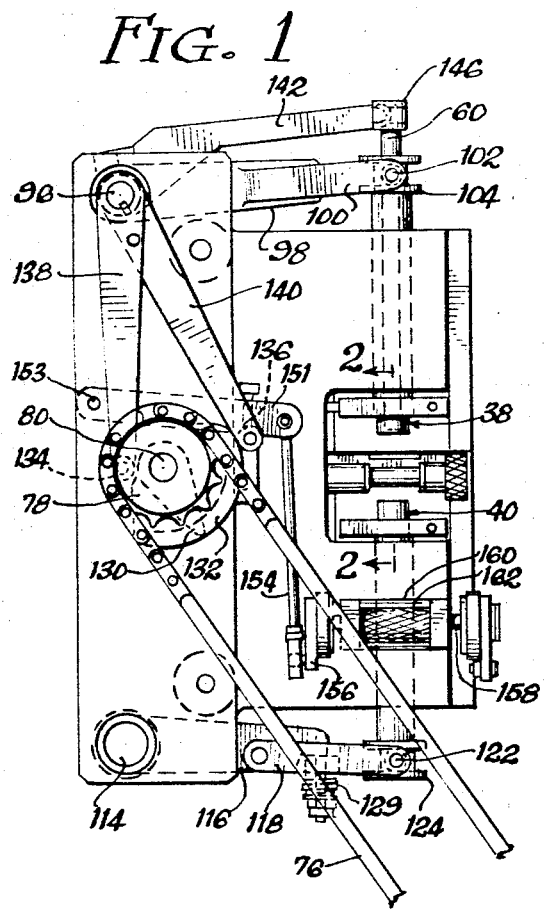
FIGURE 1 is a rear elevational view of the structure employed in the manufacture of the bags of this invention; adapted to be associated with each tool.

The accompanying drawings illustrate the apparatus employed as well as the bag structures produced thereby. FIGURES 1, 7 and 8 best illustrate the general character of the apparatus. In these figures, there is shown a supply of polyethylene 10 which in the preferred embodiment is folded about the edge 12 whereby grommets 14 can be applied at the closed end of the bag. It will be noted that the sheet 10 is continuous in the illustrations provided and the sheet is adapted to be severed along the lines 16 to form individual bags. Heated plates are preferably used for this operation since they simultaneously effect heat sealing along the edges of the bags.

A supply of grommet forming material in the form of strips 18 is provided in rolls 20 located on reels 22. Adjustable arms 24 are attached to these reels, and these arms carry guide rollers 26 to properly present the strips 18 for introduction into the forming apparatus. The reels 22 are idler reels in the embodiment shown since driving movement is imparted by pulling the strip through the apparatus.

Figure 2:
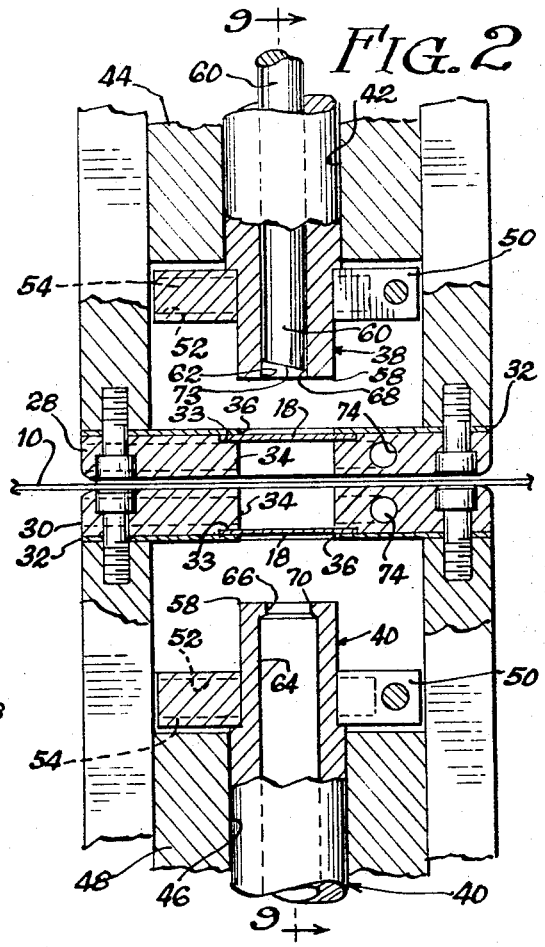
FIGURE 2 is an enlarged cross-sectional view taken about the line 2—2 of FIGURE 1.
Figure 3:
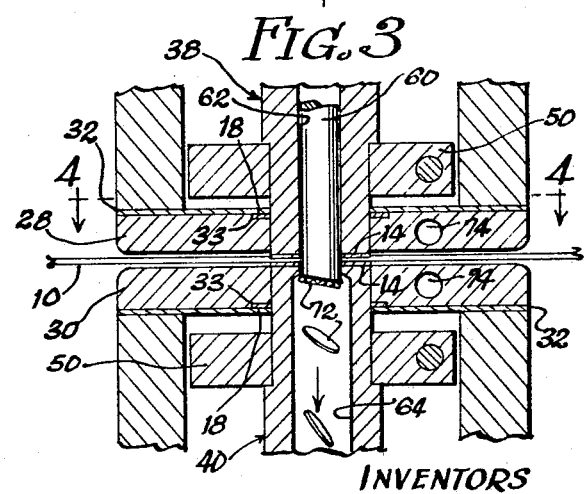
FIGURE 3 is an enlarged cross-sectional view illustrating the elements of FIGURE 2 in the grommet applying and forming positions.

The forming apparatus includes upper and lower platens 28 and 30. These platens are spaced apart as best shown in FIGURES 2, 3 and 9 whereby the sheet 10 can be passed between the platens. On the upper surface of the platen 28 and on the bottom surface of the platen 30, there are provided plates 32. An indented passage 33 is formed in each of the platens whereby the strips 18 are adapted to pass over the platens while being confined by the plates 32. Each of the platens defines a bore 34, and each of the plates defines an opening 36 in alignment with the bores 34.

The apparatus includes a pair of reciprocally mounted tools 38 and 40. The upper tool 38 is mounted for reciprocation in a bore 42 defined by the upper block 44. The lower tool 40 is similarly movable in the bore 46 defined by the block 48. Each of the tools carries a heating plate 50 adjacent its working end. As shown in FIGURE 10, the plate 50 defines a pair of bores 52 and heating elements 54 are adapted to be inserted therein. Electrical leads 56 provide the necessary energy for operation of the heating elements.

Each of the tools defines a cutting edge 58, and the diameter of the tools is such that they are adapted to fit snugly within the openings 36 defined by the plates 32 and the bores 34 defined by the platens 28 and 30. As best shown in FIGURE 3, entry of the tools in the manner described provides for severing of the grommets 14 from the strip 18.

Continued movement of the tools operates to bring the tools into proximity with the sheet 10 whereby the grommets 14 can be applied thereto. It will be appreciated that the heating elements 56 can be operated to maintain the working ends of the tools at a sufficiently high temperature whereby heat sealing of the grommets to the sheet 10 can be effected. Where the sheet 10 is formed of polyethylene or other heat sealable material, heat sealing of the folded sheet is also effected in the area of the grommets whereby a particularly sturdy construction is provided. As set forth in the aforementioned copending application, the grommets may comprise a paper material having a coating of polyethylene thereon to enable heat sealing in the manner described. Other variations are set forth in said copending application, and it will be understood that the disclosure thereof is incorporated herein by reference. Obviously, the variety of combinations of bag materials and grommet forming materials which are discussed in the copending application will be readily adaptable for use in the systems described herein.

It will be noted that the tool 38 includes an internal rod 60 which comprises a piercing element. The rod 60 is reciprocally movable within a bore 62 defined by the tool 38. The tool 40 defines a central bore 64 which terminates at its upper end in a portion 66 of reduced diameter. The portion 66 is adapted to snugly receive the piercing rod 60 and as best shown in FIGURE 3, this mechanism provides for the formation of the central opening in the grommets 14. Specifically, the piercing rod 60 is adapted to be moved along with the tool 38 and after the grommets 14 are in place, drive elements, to be described, are provided for causing the rod 60 to overtake the tool 38 and to pass through the grommets and into the bore portion 66.

The outer edge 68 of the rod 60 and the edge 70 of the bore portion 66 provide cutting edges to provide for formation of the grommet opening. The larger diameter bore portion 64 operates to permit free removal of the scrap pieces 72 removed from the grommets and from the bag material.

In the preferred form of this invention, the bottom face 73 of the rod 60 is inclined whereby the edge 68 will engage the grommet material in a sequential manner. This arrangement provides a highly satisfactory means for insuring the free fall of the scrap pieces 72. When the rod end is cut across a plane perpendicular to the rod axis, the rod cuts through the material in a manner such that tearing can occur, particularly if the cutting edges become slightly worn. Furthermore, in the preferred arrangement, the chips assume an angular disposition which causes them to fall more freely.

Figure 4:
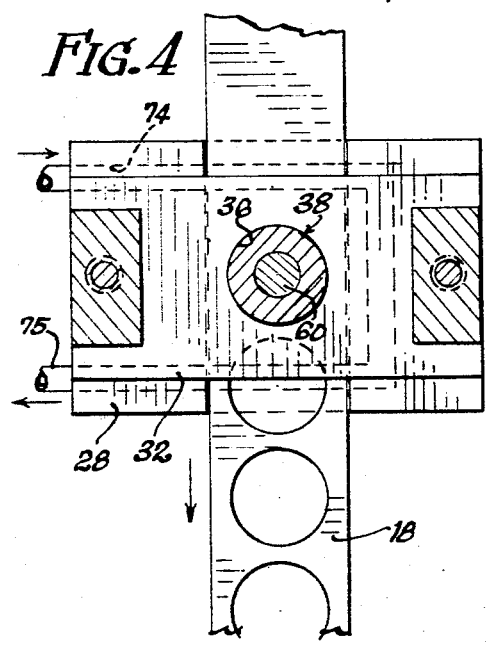
FIGURE 4 is a cross-sectional view taken about the line 4—4 of FIGURE 3.

It will be noted that the platens 28 and 30 define passages 74, and these passages are adapted to carry cooling fluid fed through flexible tubes 75 (FIGURE 6). The platens are designed in the manner shown in FIGURES 4 and 11 in order to maintain the bag forming material at a suitably low temperature. With this arrangement, the proximity of the tools 38 and 40 will not heat up the platens to the point that heat sealing of the bag material will occur in areas other than the area of grommet application.

The operation of the apparatus of this invention is preferably carried out in a completely automatic fashion. Specifically, the apparatus illustrated is adapted to provide for feeding of the sheet material and of the grommet forming strips in an intermittent fashion whereby the materials will be held stationary during the cutting and piercing action of the reciprocally mounted tools 38 and 40. The drive means for the elements described comprise a drive chain 76 which engages sprocket wheel 78. The sprocket wheel is mounted on a shaft 80 which carries a plurality of cam elements. The individual cam elements provided on the shaft 80 control the reciprocating movement of the tools 38 and 40, the movement of the piercing rod 60, and the drive means for the strips 18.

The movement of the tools 38 and 40 is controlled by cams 82 and 84. The cam 82 is engaged by the roller 86 comprising a cam follower, and the cam follower is mounted on an arm 88 which is secured to lever arm 90. The arm 90 is in turn secured to a cylinder 94 which is mounted for rotary movement about a shaft 96.

Rotary movement of the cylinder 94 results in movement of an arm 98 which is operatively connected to this cylinder. The arm 98 terminates in a bifurcated end 100, and pins 102 carried by the bifurcated arm are received in the spool 104 formed in the upper end of the tool 38. It will be apparent that rocking movement of the cylinder 94 will result in corresponding movement of the arm 98 whereby the tool 38 can be vertically reciprocated.

A pin 106 extends through the lower end of the arm 98 and the upper end of the arm 108 defines a fork 110 whereby the arm 108 will fit around the pin 106, and its movement will be controlled thereby. A roller 112 is carried by the pin, and this roller is adapted to engage the cam 84. It will be apparent that the rotation of the shaft 80 will result in back and forth swinging movement of the arms 90 and 108 in a synchronized fashion. The swinging movement is permitted since the forked end of the arm 108 allows relative movement with respect to the pin 106 carried by the arm 90. Positive back and forth action is achieved since both of the arms carry a cam follower in the form of rollers 86 and 112. The respective cam surfaces define relatively sharp rises which engage the respective followers to provide rapid penetrating and retracting actions whereby only a minimum delay in strip and sheet movement is necessary.

The arm 108 is secured to a shaft 114, and this shaft carries arm 116 extending outwardly therefrom. A pair of links 118 are pivotally connected to the arm 116 at 120, and each of these links carries a pin 122. These pins engage the spool 124 defined by the tool 40.

As the arm 108 is pivoted about the shaft 114, rocking movement is achieved by the arm 116 to impart vertical reciprocal movement to the tool 40. It will be noted the arm 116 includes a downwardly extending portion 126 which defines seats 128 for holding springs 129. These springs bear against the links 118 so that a resilient connection is provided. This arrangement prevents the ends of the tools 38 and 40 from slamming together since the tool 40 will give when the tools are brought together. Sufficient pressure is, however, provided to enable the proper application of the grommets.

The forked end 110 of the arm 108 is deliberately designed whereby relative lateral movement can be achieved between this end and the end of the arm 90. The upward stroke of the tool 40 and the downward stroke of the tool 38 is thus positively controlled by the respective cams 82 and 84 since enough clearance is provided between the forked end and the pin 106 to avoid contact between these members during the strokes of the respective tools. This enables relative adjustment of the cams 82 and 84 to provide the best operating arrangement while the provision of the two cam followers also insures positive mechanical return strokes of each of the tools.

The operation of the piercing rod 60 is controlled by means of cams 130 and 132, also mounted on the shaft 80. Cam followers 134 and 136 respectively engage these cams and lever arms 138 and 140 are respectively associated with the cam followers. The arms 138 and 140 are directly tied to the shaft 96 whereby movement imparted to the arms will result in rotation of the shaft 96.

At the end of the shaft 96, there is attached an arm 142, and a pin 144 is carried at the end of this arm. The upper end of the piercing rod 60 carries an element 146 which defines a recess 148 within which the pin 144 is received. The action imparted to the shaft 96 by the cams 130 and 132 results in rocking movement in the arm 142 and vertical reciprocal movement of the piercing rod 60.

It will be noted that the cam 130 is tear-shaped whereby an abrupt action can be imparted to the cam follower 134 by this cam. When considering the illustration in FIGURE 1, it will be apparent that clockwise rotation of the shaft 80 will result in a rapidly increasing downward movement of the piercing rod 60. The rate of movement of the rod can readily be synchronized with the movement of the tool 38 described above whereby the rod 60 will not pass the end of the tool until such time as the tool 38 has nearly approached the position of FIGURE 3. It will be noted when considering FIGURE 1 that the cam 132 takes over to effect the return stroke of the rod 60 to again provide a positive mechanical action in the return stroke. These cams are also designed for rapid tool movements to clear the path for the strip and sheet.

The positive driving action which is imparted to the tools during heat sealing and during retracting comprises an extremely important advantage of the instant invention. Since the cams drive the tools in both directions, a constant pattern of machine operation will occur thereby insuring reliable operation. This arrangement permits the formation of the bags at a high rate.

The movement of the strips 18 through the apparatus is accomplished through action of an eccentric cam 150 which is also mounted on the shaft 80. A cam follower 152 in the form of a roller is connected to arm 151 which is pivotally connected at 153 (FIGURE 1) and a crank arm 154 is connected to the arm 151. The arm 154 is attached at its end to a lever arm 156 and the arm 156 is operatively connected to a shaft 158 which carries a drive roller 160. The strips of tape 18 are adapted to pass between this roller and a friction idler roller 1622. The roller 160 preferably is of rubber or is otherwise provided with a resilient surface to squeeze the strips for positive arrangement.

The cam 150 imparts a reciprocating action to the arm 154 and a rocking action is imparted to the arm 156. Conventional clutch means in the form of ratchets operatively connect the arm 156 and the shaft 158 whereby rotary movement is imparted to the friction drive roller 160 only during the downward stroke of the crank arm 154. With this arrangement, the strips of tape 18 are pulled forward only during the downward stroke of the crank arm. The system is synchronized so that the action of the cam 150 will move the tape forward during the return stroke of the tools 38 and 40 while the strips 18 are held stationary during the time that the tools 38 and 40 engage the strips for imparting the cutting action.

The location of the rolls 160 and 162 beneath the area of grommet application greatly improves the machine operation. Thus, the strips of waste are directed downwardly away from the operating parts of the mechanism whereby they can be collected without the danger of being caught in the machine.

FIGURES 12, 13 and 14 illustrate typical bag constructions adapted to be manufactured in accordance with the concepts of this invention. FIGURE 12 illustrates a bag having a grommet 14 which is formed by the specific apparatus described. The heat sealed edges 164 are preferably formed by means of a heated knife in the manner previously described. The grommets are applied adjacent the folded edge 12 whereby an open end will be provided at 166 to permit filling of the bags.

FIGURES 13 and 14 illustrate bags 168 and 170 having a slightly different configuration. In these instances, the bags are formed of tubular plastic materials wherein the sides 172 are normally continuous and do not require any sealing operation. A line for heat sealing is provided at 174 to close off one end, and after filling, a similar heat seal can be provided at the open ends 176.

The grommets 178 and 180 applied to the bags are of a different configuration than the annular grommets 14. It will be appreciated that the apparatus of this invention is capable of applying grommets of a wide variety of configurations since the outer peripheries of the tools and of the piercing rod can be readily changed. Furthermore, it is possible to apply the grommets to tubular bags by fitting the bags lengthwise and adjusting the positions of the tools 38 and 40 relative to the bag edge as desired.

FIGURE 15 illustrates the manner in which the bags are employed for merchandising purposes. As indicated, the end 166 through which the bags were filled becomes the bottom of the bag while the end provided with the grommet becomes the top of the bag. The bag of this invention is particularly desirable in this connection since the manufacturing procedure automatically results in a bag having an open end to simplify filling purposes, and the closing of this end is the only step required subsequent to filling. This is obviously preferable to procedures and constructions wherein the grommets cannot be applied until after filling has been accomplished.

It will be understood that various charges and modifications may be made in the structures and systems of this invention which provide the characteristics of this invention without departing from the spirit thereof particularly as defined in the following claims.

That which is claimed is:

1. A method for the production of grommet bags comprising the steps of providing a heat sealable material for the formation of the enclosure defined by the bag, positioning a pair of grommet forming members having heat sealing characteristics on opposite sides of said material, providing a pair of tools, heating at least one of said tools, positively driving said tools into contact with said grommet forming members to provide for heat sealing of said members to said material, said tools including separate piercing means for piercing said grommet forming members to form openings therein, positively driving said piercing means through said grommets as a step conducted substantially simultaneous with the contact of the tools with the grommet forming members whereby the grommet forming members are pierced substantially simultaneously with the application of the members to the material, and positively driving said tools for retracting movement after said application.

2. A method in accordance with claim 1 wherein said bags are formed of polyethylene and wherein said grommet forming members comprise annular paper rings having a coating of polyethylene over the surface to be applied to the material.

3. A method in accordance with claim 1 including the steps of continuously feeding a sheet of bag forming material between said tools and simultaneously feeding continuous strips of grommet forming material between said tools and on opposite sides of said sheet.

4. An apparatus for forming grommet bags wherein the grommets comprise a pair of substantially flat members fixed on opposite sides of said bags with aligned openings defined by each of said members and by said bag, and wherein the grommets are adapted to be heat sealed to the bag, said apparatus comprising a pair of movable grommet applying tools, a supply of bag forming material, a supply of grommet forming material, means for simultaneously disposing the bag forming material and the grommet forming material in position between said tools with the grommet forming material being disposed on opposite sides of the bag forming material, means for heating said tools, means for positively driving said tools toward each other into contact with said grommet forming material, one of said tools carrying a piercing member and the other of said tools defining a bore for receiving said piercing member whereby said tools are adapted to substantially simultaneously form said openings and to effect heat sealing of said grommet forming material to said bag forming material, and means for positively driving said tools for retracting movement away from said material.

5. An apparatus for forming grommet bags wherein the grommets comprise a pair of substantially flat members fixed on opposite sides of said bags with aligned openings defined by each of said members and by said bag, and wherein the grommets are adapted to be heat sealed to the bag, said apparatus comprising a pair of movable grommet applying tools, a supply of bag forming material, means for continuously feeding said bag material between said tools, a supply of grommet forming material, means for continuously disposing said grommet material between said tools and in overlying positions on opposite sides of said bag material, means for heating said tools, means for driving said tools toward each other into contact with said grommet material, one of said tools carrying a piercing member and the other of said tools defining a bore for receiving said piercing member whereby said tools are adapted to substantially simultaneously form said openings and effect heat sealing of said grommet material to said bag material, and means for positively driving said tools for retracting movement away from said material.

6. An apparatus in accordance with claim 5 wherein said bag material comprises a continuous folded sheet of polyethylene and wherein the folded edge of said sheet is passed between said tools, said grommet material comprising first and second continuous strips of paper, and wherein said tools are adapted to pass through said strips to form said grommets with the tool carrying said piercing member thereafter forming said openings.

7. An apparatus in accordance with claim 6 wherein said tools define outer configurations corresponding to the desired outer configurations of said grommets, and wherein said tool carrying said piercing member defines a central bore with said piercing member being reciprocally movable in said bore.

8. An apparatus in accordance with claim 7 wherein said piercing member defines an inclined end whereby the cutting edges of said member cut through the grommets and bag material in a sequential fashion.

9. An apparatus in accordance with claim 5 wherein the means for driving said tools comprise a cam shaft and cam elements mounted on the shaft, a pair of cam followers associated with each of said tools, and including individual cams for each of said followers whereby movement of said tools toward and away from the grommet applying area is positively controlled through engagement of said followers with said cams.

10. An apparatus in accordance with claim 5 wherein said grommet material comprises first and second continuous strips, drive means for pulling said strips through said apparatus, and means for periodically operating said drive means whereby said strips are held stationary during sealing of the grommet material to the bag material, said last mentioned means comprising gripping rolls engaging said strips and including cam and cam follower means for periodically rotating said rolls, said rolls being located below the path of movement of said bag material whereby the strips are pulled downwardly away from said apparatus.

11. An apparatus for forming grommet bags wherein the grommets comprise a pair of substantially flat members fixed on opposite sides of said bags with aligned openings defined by each of said members and by said bag, and wherein the grommets are adapted to be heat sealed to the bag, said apparatus comprising a pair of movable grommet applying tools, a supply of bag forming material, means for continuously feeding said bag material between said tools, a supply of grommet forming material comprising first and second continuous strips, means for continuously feeding said strips into position between said tools and in overlying relationship with respect to the opposite sides of said bag material, means for heating said tools, and means for driving said tools toward each other into contact with said grommet material, one of said tools carrying a piercing member and the other of the tools defining an opening for receiving said piercing member, each of said tools defining an outer configuration corresponding to the desired outer configurations of said grommets and said piercing member being reciprocally movable within said one tool whereby said tools are adapted to engage said grommet material for forming grommets therefrom and whereby said piercing member is adapted to thereafter form said openings.

12. An apparatus in accordance with claim 11 wherein said bag material comprises a folded sheet of polyethylene and wherein the means continuously feeding the sheet dispose the folded edge thereof between said tools, and wherein said strips of grommet material are fed at right angles with respect to the feeding direction of said sheet.

13. An apparatus in accordance with claim 11 including upper and lower platen members having opposed surfaces spaced apart a distance sufficient for receiving said sheet therebetween, the first of said strips being fed over the top surface of the upper platen and the second of said strips being fed over the bottom surface of the lower platen, and openings defined by said platens for receiving said tools, said strips being fed over said platen openings whereby entry of said tools into said platen openings results in formation of said grommets from said strips.

14. An apparatus in accordance with claim 13 including heating plates attached to each of said tools and movable therewith, and heating elements associated with said plates to maintain said tools in a heated condition.

15. An apparatus in accordance with claim 14 including cooling means associated with said platens to maintain said platens at a relatively low temperature and to thereby prevent heat sealing of the bag material passing between said platens except in the area of said grommets.

16. An apparatus in accordance with claim 11 including a cam shaft, cam elements mounted on said shaft, and cam followers associated with each of said tools whereby rotation of said shaft controls the movement of said tools.

17. An apparatus in accordance with claim 16 wherein a pair of cam followers are associated with each of said tools, and including individual cams for each of said followers whereby reciprocal movement of said tools can be positively controlled by respective cam followers.

18. An apparatus in accordance with claim 16 including a cam follower associated with the reciprocal piercing member provided in said one tool and a separate cam element on said shaft for thereby controlling the movement of said piercing member relative to said one tool.

19. An apparatus in accordance with claim 16 wherein said strips are intermittently driven by means of a friction wheel engaging the strips, a separate cam element on said shaft, a cam follower associated with said separate cam element, and a crank arm connected at one end to said cam follower and operatively connected at the other end to said friction wheel to thereby provide intermittent driving movement to said wheel.

References Cited

UNITED STATES PATENTS

| | | | |
|---|---|---|---|
| 2,353,232 | 7/1944 | Greene | 156—253 |
| 2,414,157 | 1/1947 | Marziani | 156—513 |
| 3,256,127 | 6/1966 | Brieske | 156—253 |

DOUGLAS J. DRUMMOND, *Primary Examiner.*